US012697788B2

(12) United States Patent
Barslev et al.

(10) Patent No.: US 12,697,788 B2
(45) Date of Patent: Aug. 4, 2026

(54) LAYUP PROCESS FOR WIND TURBINE BLADE MANUFACTURING

(71) Applicant: LM WIND POWER A/S, Kolding (DK)

(72) Inventors: Henrik Barslev, Cherbourg en Contentin (FR); Ton Dobbe, DH Heerhugowaard (NL)

(73) Assignee: LM Wind Power A/S, Kolding (DK)

( * ) Notice: Subject to any disclaimer, the term of this patent is extended or adjusted under 35 U.S.C. 154(b) by 85 days.

(21) Appl. No.: 18/708,458

(22) PCT Filed: Dec. 7, 2022

(86) PCT No.: PCT/EP2022/084757
§ 371 (c)(1),
(2) Date: May 8, 2024

(87) PCT Pub. No.: WO2023/104870
PCT Pub. Date: Jun. 15, 2023

(65) Prior Publication Data
US 2024/0416595 A1     Dec. 19, 2024

(30) Foreign Application Priority Data
Dec. 8, 2021     (EP) .................................... 21213223

(51) Int. Cl.
| | |
|---|---|
| *B29C 70/24* | (2006.01) |
| *B29C 65/56* | (2006.01) |
| *B29C 70/42* | (2006.01) |
| *B29C 70/54* | (2006.01) |
| *B29L 31/08* | (2006.01) |

(52) U.S. Cl.
CPC ............ *B29C 70/24* (2013.01); *B29C 65/564* (2013.01); *B29C 70/42* (2013.01); *B29C 70/541* (2013.01); *B29C 70/543* (2013.01); *B29L 2031/085* (2013.01)

(58) Field of Classification Search
None
See application file for complete search history.

(56) References Cited

U.S. PATENT DOCUMENTS

| | | | |
|---|---|---|---|
| 2015/0314536 A1* | 11/2015 | Smith ..................... | B29C 70/34 |
| | | | 428/192 |
| 2017/0165923 A1* | 6/2017 | Chen ...................... | B65H 75/14 |
| 2018/0154593 A1* | 6/2018 | Hunter ...................... | F16B 5/00 |

FOREIGN PATENT DOCUMENTS

| | | |
|---|---|---|
| WO | 2014094787 A1 | 6/2014 |
| WO | 2016180420 A1 | 11/2016 |

* cited by examiner

*Primary Examiner* — Barbara J Musser
(74) *Attorney, Agent, or Firm* — Dority & Manning, P.A.

(57) ABSTRACT

The present invention relates to a method of manufacturing a wind turbine rotor blade part comprising stacking a plurality of plies (70, 71, 72) to form a stack of plies (80) such that the stack of plies has at least one stepwise tapering edge (84, 85). A plurality of plastic fasteners (90) is used to interconnect the plies (70, 71, 72) by passing the plurality of plastic fasteners (90) through the stack of plies to form a stack of interconnected plies (82). The stacks of interconnected plies (82a, 82b, 82c, 82d) are arranged within the blade mold, followed by resin infusion into the one or more stacks of interconnected plies within the blade mold, and curing and/or hardening the resin in order to form the blade part.

16 Claims, 6 Drawing Sheets

94

82a          82b          82c 82b          82c

82a

94

LAYUP PROCESS FOR WIND TURBINE BLADE MANUFACTURING

Figure 1:
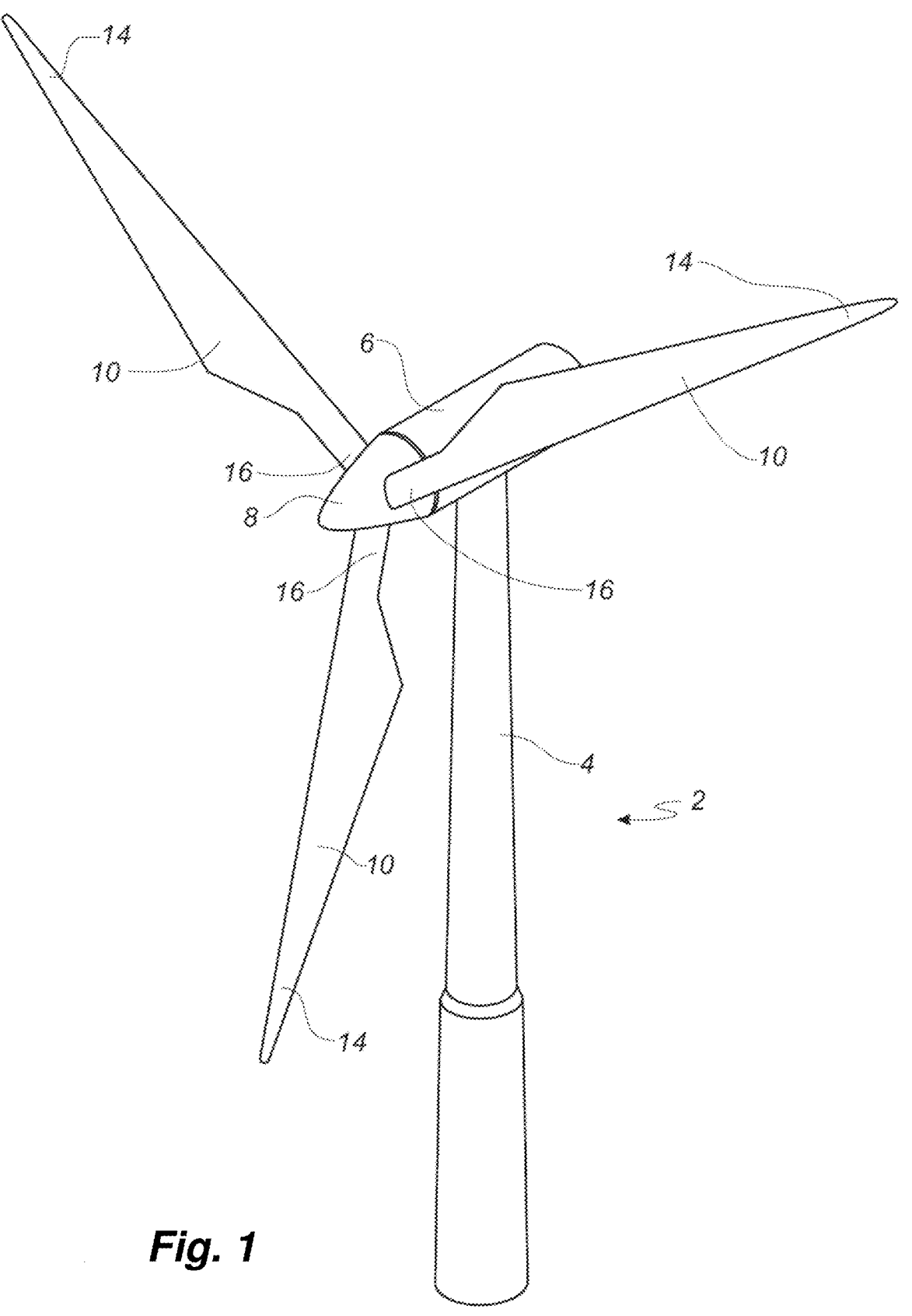

This is a National Phase Application filed under 35 U.S.C. 371 as a national stage of PCT/EP2022/084757, filed Dec. 7, 2022, an application claiming the benefit of European Patent Application No. 21213223.7, filed Dec. 8, 2021, the contents of each of which is hereby incorporated by reference in its entirety.

FIELD OF THE INVENTION

The present invention relates to a method of manufacturing a wind turbine rotor blade part, to a stack of interconnected plies and to a kit of parts for manufacturing a wind turbine rotor blade part.

BACKGROUND OF THE INVENTION

Wind power provides a clean and environmentally friendly source of energy. Wind turbines usually comprise a tower, generator, gearbox, nacelle, and one or more rotor blades. The blades of wind turbines capture kinetic energy of wind using known airfoil principles. Modern wind turbines may have rotor blades that exceed 90 meters in length.

Wind turbine blades are usually manufactured by forming two shell parts or shell halves from layers of fibre material and resin. The shell halves of wind turbine blades are typically formed in blade molds. First, a blade gel coat or primer is applied to the mold. Subsequently, fibre reinforcement and/or fabrics are placed into the mold followed by resin infusion. A vacuum is typically used to draw epoxy resin material into a mold. Alternatively, prepreg technology can be used in which a fibre or fabric pre-impregnated with resin forms a homogenous material which can be introduced into the mold. Several other molding techniques are known for manufacturing wind turbine blades, including compression molding and resin transfer molding. The shell halves are assembled by being glued or bolted together substantially along a chord plane of the blade.

In the blade molding process, the fibre material is often stacked forming a plurality of stacked layers, while aligning an orientation of the fibres with the longitudinal direction of the elongated structure for providing stiffness in the longitudinal direction. Correct alignment and positioning of the stacked fibre layers is of great importance for the reliability and strength of the elongated structure. Any fibre misalignment can result in a failure or breakage of the wind turbine blade.

However, especially for large blades a number of challenges exists when arranging fibre layers within the blade mold, in particular in the root region thereof, which usually comprises inclined and even close to vertical molding surfaces. Thus, undesired sliding movement within the layer stack and/or of the entire layer stack needs to be prevented. This is sometimes addressed by adding an adhesive, tackifier or a binding agent in between the fibre layers. Other known solutions involve using an adhesive tape in between fibre layers.

However, this is often not found satisfactory in terms of cohesion and workability of such fibre stacks. Also, these known solutions tend to result in a reduced mechanical performance in the blade laminate. An additional problem of known approaches for providing consolidated fibre arrangement is the formation of voids, which may subsequently result in gaps or resin pockets, which may act as crack initiators.

It is thus a first object of the present invention to provide an improved layup process for wind turbine blade manufacturing.

It is a further object of the present invention to provide a method of manufacturing a wind turbine blade part which results in a reduction or elimination of the formation of wrinkles or other defects in the fibre laminate.

It is a further object of the present invention to provide a method of manufacturing a wind turbine blade part which is quicker, more efficient and less prone to layup mistakes.

SUMMARY OF THE INVENTION

The present inventors have found that one or more of said objects may be achieved by a method of manufacturing a wind turbine rotor blade part, the method comprising the steps of:

stacking a plurality of plies to form a stack of plies such that the stack of plies has at least one stepwise tapering edge, providing a plurality of plastic fasteners, each plastic fastener having an elongated, preferably flexible, filament with a first enlargement at a first end of the flexible filament and a second enlargement at an opposing second end of the flexible filament, interconnecting the plies by passing the plurality of plastic fasteners through the stack of plies to form a stack of interconnected plies, preferably repeating the above steps for forming a plurality of stacks of interconnected plies, providing a blade mold defining an outer shape of the rotor blade or a portion thereof, arranging at least one of the stacks of interconnected plies within the blade mold, infusing resin into the one or more stacks of interconnected plies within the blade mold, and curing and/or hardening the resin in order to form the blade part.

It is found that this method significantly reduces in-mold time in blade manufacturing as the fibre layers can be pre-assembled and consolidated in a simple, yet efficient way. In addition, by providing offsets in the form of a stepwise tapering edge, layup mistakes can be minimised in the blade mold cavity, as the stepwise tapering edges can be used for mating engagement of adjacent stacks of layers, thus providing improved guidance to operators. Also, gap formation and resulting undesirable resin pockets can be largely avoided by the method of the present invention.

Furthermore, a quicker and more efficient production process for the preformed stacks of layers is provided as compared to known methods, such as applying adhesive tape or stitching. The inventive method is found to lead to a significant reduction of wrinkles in the resulting laminate. The tagging of the fibre plies by the plastic fasteners ensures a minimization of tension and stress in the resulting consolidated stacks, as compared to e.g. a stitching process.

It is also found that some of the prior art approaches that involve one or more stitching operations can be rather time-consuming and laborious. Also, known processes relying on stitching tend to depend on the individual skill set and on appropriate training of the responsible operators. The present inventors have found that such known methods often result in less than satisfactory repeatability. Stitching-based operations are also found to have a higher likelihood of creating deformations in the glass fibre layup, thus risking to negatively impact cycle time.

Importantly, the methods and products of the present invention, comprising the plurality of plastic fasteners for interconnecting the plies, are relatively efficient and help to simplify the overall process, as handling of the plastic fasteners or tags does not require a specialized skill set. Advantageously, the plastic fasteners can be applied in a tagging operation, e.g. using a tagging gun, such that each filament is passed through all plies of the stack. The step of passing the plastic fasteners through the plies of the stack is preferably carried out using a tagging gun, such as a hand-held tagging gun. Thus, for example, each operator can have their own tagging gun during the lay-up process. This is found to provide a particularly quick and efficient process, thus improving the cycle time.

By introducing plastic fasteners (or tags) through the plies, the edge of the plies/layers are efficiently secured, thus leading to an overall elimination of longitudinal wrinkles and of the occurrence of folded and/or misplaced layers.

The wind turbine rotor blade part of the present invention may preferably be a shell half, such as a pressure side shell half or a suction side shell half. The step of stacking a plurality of plies to form a stack of plies can be advantageously carried out on a suitable molding surface, such as a preform molding surface of a preform mold. In some embodiments, the stack of plies has a length of at least 10 meters, such as at least 20 meters. In a preferred embodiment, each ply has a thickness of 0.5-2.5 mm. Preferably, the length of the stack of plies exceeds its width.

A plurality of plies, such as plies of fibre material, such as glass fibre material, can thus be arranged within a preform mold to form the stack of plies. The laying step to form the stack of plies will typically comprise the use of one or more fibre lay-up devices. The fibre material of the plies may comprise glass fibres, carbon fibres or a combination thereof. In a preferred embodiment, each ply is formed as a substantially rectangular sheet. The rectangular sheets can be arranged with an offset such that the stack has a stepwise tapering edge. Alternatively or additionally, the rectangular sheets can have different lengths and or widths, such forming a stepwise tapering edge when stacking the sheets.

It is preferred that at least five layers, such as at least ten layers, for example 10-30 layers, are arranged to form the stack of plies. One or more of the plies, such as all of the plies, are preferably fibre layers, such as fibre fabrics. The plies may include one or more uniaxial fibre mats and one or more biaxial fibre mats. Preferably, at least one of the plies of the stack is a uniaxial fibre mat. Also, preferably, at least one of the plies of the stack is a biaxial fibre mat.

Typically, the stack of plies has a top surface, an opposing bottom surface and four laterally extending edges, wherein one or more of the laterally extending edges is formed as a stepwise tapering edge. In some embodiments, each ply of the stack has ends which are square-cut. In a preferred embodiment, the height of each step of the stepwise tapering edge of the stack corresponds to the thickness of each ply. Thus, each step of the stepwise tapering edge of the stack may be formed by one of the plies, for example one of the glass fibre plies.

In a preferred embodiment, during the stacking process, the plies are arranged on top of each other with an offset along their edges, such that a stepwise tapering edge of the stack is formed. In some embodiments, two or more of the plies of the stack have a different size, such as a different width, or a different length. For example, the lowermost ply of the stack may have the largest dimensions, e.g. the largest length, whereas the subsequent plies may become smaller and smaller towards the top of the stack, i.e. have decreasing lengths.

The stack of plies usually has a length extending along the longitudinal direction of the stack, a width and a thickness. The length, or longitudinal extent, of the stack is usually its greatest dimension. Thus, the width and the thickness of the stack of plies is preferably less than its length or longitudinal extent. The stack may have a length of at least 10 meters, such as at least 15 meters, preferably at least 25 meters. When arranged in the blade mold, the length or longitudinal extent of the stack will typically be aligned with the spanwise direction of the wind turbine blade. One or more of the plies may be a fibre mat, such as a glass fibre mat, preferably a uniaxial glass fibre mat.

A plurality of plastic fasteners is provided for each stack, such as at least 20 or at least 50 plastic fasteners per stack. In a preferred embodiment, 5-20 plastic fasteners are applied per square meter (m2) of the stack top surface. Each plastic fastener has an elongated, preferably flexible, filament with a first enlargement at a first end of the flexible filament and a second enlargement at an opposing second end of the flexible filament. The first and second enlargements are preferably oriented transversely to the flexible filament. In a preferred embodiment, the first and second enlargements are shaped as a rectangular plate. In a particularly preferred embodiment, the plastic fasteners are I-shaped. In a preferred embodiment, the elongated filament of each plastic fastener has a length of 3-40 mm, more preferably 5-20 mm. It is preferred that the fasteners are made from a polyester.

In an advantageous embodiment, the plastic fasteners are I-shaped, wherein the elongated filament of each fastener has a length of 30-50 mm. It is preferred that the length of the first enlargement and of the second enlargement of the I-shaped fastener has a length of 4-10 mm, preferably 5-8 mm. These dimensions are found to allow for a particularly efficient joining of plies with reduced gap formation and minimization of resin pockets.

The plies are interconnected by passing the plurality of plastic fasteners through the stack of plies, usually from the top surface to the bottom surface of the stack or vice versa, to form a stack of interconnected plies. This can be done by a tagging operation, e.g. using a tagging gun. It is preferred that the elongated filament is oriented substantially normal to the top and/or bottom surface of the stack. Thus, each filament preferably extends through all plies of the stack. The step of passing the plastic fasteners through the plies of the stack is preferably carried out using a tagging gun, such as a hand-held tagging gun. In a preferred embodiment, the stack has a top surface and an opposing bottom surface, wherein the plastic fasteners extend from the top surface to the bottom surface of the stack. It is preferred that the first enlargement and the second enlargement of each fastener are located above and below the stack, respectively.

In one embodiment, the plies are interconnected by passing the plurality of plastic fasteners through the stack of plies, wherein each fastener is passed through the stack of plies twice, such that the first enlargement at a first end of filament and the second enlargement at the opposing second end of the filament are located at the same surface of the stack, such as at the bottom surface of the stack or at the top surface of the stack. It is thus preferred that both enlargements are located at a first surface of the stack, e.g., at the bottom surface, while a portion of the filament of the fastener extends along an opposing second surface of the stack, e.g., along the top surface of the stack.

Such arrangements are found to allow for a particularly efficient and reproducible manufacturing process of the stacked plies, while minimizing the occurrence of wrinkles in the resulting stack. Thus, in some embodiments, a first and a second portion of the elongated filament is oriented substantially normal to the top surface and/or to the bottom surface of the stack, whereas a third portion, which is located between the first and the second portion, is oriented substantially parallel or in-plane with the top or bottom surface of the stack.

The arrangements in which each fastener is passed through the stack of plies twice, such that the first enlargement and the second enlargement are located at the same surface of the stack, can advantageously be manufactured by using a device with at least two needles or pins for pushing the fastener at each end thereof through the plies, i.e., at two different locations or opposed penetration points, preferably in a simultaneous penetrating motion.

It is preferred that the plastic fasteners are arranged in a regular pattern, preferably in rows and columns of fasteners, i.e. columns that are substantially parallel to the longitudinal direction of the stack, and rows that are substantially parallel to the width direction of the stack. In a preferred embodiment, the plastic fasteners are applied in an equidistant arrangement. In some embodiments, the plastic fasteners are arranged in rows and columns of fasteners, wherein the distance between two adjacent fasteners in a row, or in all rows, is substantially the same. In some embodiments, the plastic fasteners are arranged in rows and columns of fasteners, wherein the distance between two adjacent fasteners in a column, or in all columns, is substantially the same.

In a preferred embodiment, plastic fasteners are arranged along one or more edges of the topmost ply, preferably along an edge extending in the width direction of the stack and/or along an edge extending in the length direction of the stack. It is preferred that one or more of the fasteners are spaced from said edge by a distance of not more than 20 mm, more preferably not more than 10 mm. It is particularly preferred that the plastic fasteners are arranged in one or more rows and columns of fasteners, i.e. columns that are substantially parallel to the longitudinal direction of the stack, and rows that are substantially parallel to the width direction of the stack, wherein the distance between an edge of the topmost ply of the stack and a parallel row or column of fasteners is not more than 20 mm, more preferably not more than 10 mm. Such arrangements are found to a particularly coherent and gap-free formation of plies, thus reducing undesirable resin pockets in the overall layup. It is also found that wrinkle formation is further reducing using such geometries.

In a preferred embodiment, plastic fasteners are arranged along all edges of the stack, typically along all four edges of the stack. If the stack has a generally rectangular shape, plastic fasteners are preferably arranged along both opposing edges in the width direction and along both opposing edges in the length direction. Preferably, the plastic fasteners are arranged in respective rows or columns that extend substantially parallel to the respective edges of the stack. These configurations are found to yield structurally stable stacks which are easy to handle, thus helping to minimize wrinkles and resin pockets.

It is particularly preferred that a plurality of stacks of interconnected plies is formed by the steps as discussed above. The plurality of stacks preferably comprises two or more stacks of interconnected plies which have respective stepwise tapering edges that are complimentary to each other. In a preferred embodiment, the method comprises forming at least two stacks of interconnected plies, each having at least one stepwise tapering edge, wherein the stepwise tapering edges of the respective stacks of interconnected plies are complementary to each other, and wherein the step of arranging the stacks of interconnected plies within the blade mold comprises arranging the respective stacks of interconnected plies in mating engagement along their respective complementary tapering edges. Thus, a stepwise tapering edge of a first stack of interconnected plies can mate to a stepwise tapering edge of a second stack of interconnected plies.

In a preferred embodiment, the stack has a longitudinal direction and a width direction, and wherein the tapering edge is provided in the width direction. In another embodiment, the stack has a first tapering edge in the width direction and a second tapering edge in the longitudinal direction. In some embodiments, at least one stack has two opposing tapering edges in the width direction. In some embodiments, at least one stack has two opposing tapering edges in the longitudinal direction. In a preferred embodiment, at least one stack has two opposing tapering edges in the width direction and two opposing tapering edges in the longitudinal direction. It is preferred that each stack of interconnected plies is a consolidated arrangement of plies comprising fibres, such as glass fibres.

A blade mold is provided defining an outer shape of the rotor blade or a portion thereof, such as an outer aerodynamic shape of a blade shell half. At least one of the stacks of interconnected plies is arranged within the blade mold, preferably to form part of the shell of the wind turbine blade. In a preferred embodiment, two or more of the stacks of interconnected plies are arranged within the blade mold, wherein two or more of said stacks are brought into mating engagement with each other along their respective stepwise tapering edges. This is found to provide an improved guidance to operators during the manufacturing process, thus minimizing layup mistakes.

A suitable resin can then be infused into the one or more stacks of interconnected plies within the blade mold. Resin can be infused into the blade mold cavity to impregnate the stacks and potentially other material, such as spar caps, sandwich material, additional fibre material, etc, followed by curing and hardening the resin in order to form the blade part, such as the blade shell half.

The resin for injecting the stacks during the manufacturing of wind turbine blade parts may be an epoxy, a polyester, a vinyl ester or another suitable thermoplastic or duroplastic material. In other embodiments, the resin may be a thermosetting resin, such as epoxy, vinyl ester or polyester, or a thermoplastic resin, such as nylon, PVC, ABS, polypropylene or polyethylene.

In an advantageous embodiment, the plastic fasteners disintegrate upon resin infusion into the one or more stacks of interconnected plies. This can be achieved by using a suitable material for the plastic fasteners such as a thermoplastic polymer, preferably a thermoplastic polyester. Thus, preferably the resin dissolves the plurality of plastic fasteners.

In a preferred embodiment the plastic fasteners are made of, or comprise, a nylon material. In another preferred embodiment the plastic fasteners are made of, or comprise, polypropylene. In another preferred embodiment the plastic fasteners are made of, or comprise, a polypropylene copolymer.

In a preferred embodiment, the stack comprises 5-20 plies, preferably plies of fibre material. In another preferred embodiment, the plies of the stack have different lengths and/or different widths.

In a preferred embodiment, the stack of interconnected plies is rolled up onto a bobbin or reel, and is unrolled from said bobbin or reel prior to arrangement within the blade mold.

In a preferred embodiment, a plurality of stacks of interconnected plies is successively rolled up onto a bobbin or reel in a predefined order, and wherein the stacks of interconnected plies are successively unrolled from the bobbin or reel, and arranged within the blade mold in the reverse order as compared to said predefined order. Thus, the last stack would be unrolled and laid into the blade mold first, followed by the second-last stack and so on, i.e. in the reverse order as compared to said predefined order of rolling up onto the bobbin or reel. Thus, layup mistakes can be efficiently reduced by such arrangement.

Such embodiments seek to simplify the known methods of fibre lay up in the manufacturing of wind turbine blades. In particular, this approach reduces the workload for the operators with respect to the number of required steps during blade layup. For example all layers/stacks, or a subset of all layers/stacks, required in the blade shell layup process are rolled up on a single bobbin or on a limited number of bobbins, e.g. not more than 10 bobbins per half shell.

In some embodiments, the arrangement with the bobbin(s) comprises a breaking system which helps to control the winding/unwinding of the stacks/layers, depending on process requirements. This greatly simplifies the work of operators during the layup process, thus standardizing the order of fibre stacks/layers that are unwound from the bobbin for a given blade type. This, in turn, leads to increased reproducibility, quality product and productivity.

In some embodiments, a single bobbin carrying a plurality of stacks/layers could be used for layup of a half shell, the bobbin for example having a capacity of 250 kg, wherein a fixture is provided to hold the bobbin along with glass layers. For loading the bobbing, the glass layers can be cut to the required length, all sets of layers are wound onto the single bobbin, followed by transferring the whole package to shop floor. Here, the glass layers can successively unwound from the bobbin, in the predetermined order, which allows layup of the fibre sheets in said predetermined order.

Unwinding of the fibre layers can be stopped whenever required by using the breaking system. In a first step, a stack of interconnected plies are manufactured as described above. Alternatively, in a first step, the fibre layers, preferably glass fibre layers, are cut manually to the required size for fibre layup. To this end, the required fibre rolls are loaded onto a fixture, and the required sheets/layers for a given blade type are cut using the cutting list for that particular blade type.

Thus, in another aspect, the present invention relates to a method of manufacturing a wind turbine blade part, the method comprising providing a plurality of fibre layers for layup in a blade mold, preferably by cutting a plurality of fibre layers to the required size, rolling the plurality of layers of fibre material successively onto a bobbin in a predefined order, wherein the layers are subsequently successively unrolled from the bobbin and arranged within a blade mold in the reverse order as compared to said predefined order, preferably followed by resin infusion and curing to obtain a blade part, such as a half shell.

In some embodiments, the glass layers are pulled to the required length and are cut using a suitable end cutting machine. Herein, the glass fibre layer are cut according to a predetermined sequence and length, which can be compiled in a cutting list.

All stacks or fibre layers that are to be wound onto the bobbin are preferably pulled and cut as a set of fibre layers/sheets. Thus, a stack of layers/sheets is provided for each bobbin, which comprises the multiple layers/sheets. In some embodiments, a single bobbin with multiple individually cut layers/sheets of fibre material is used per shell half. In other embodiments, several bobbins, such as at least two, at least three or at least four bobbins, are used per shell half, each bobbin comprising multiple individually cut layers/sheets of fibre material.

It is preferred that the largest fibre layers are cut first and that the smaller width layers are cut and stacked subsequently, such that the largest layers/sheets are placed lowermost in the stack of layers/sheets. This will help to avoid wrinkles and reduce glass roll change over time. All the glass layers should be cut and stacked according to the blade type before starting to load to the layers/sheets to the bobbin. For example, a given blade type could be laid up from two bobbins prior to core material placement, and two bobbins after core material placement per shell.

After cutting and stacking the glass layers according to the cutting list, the layer pulling stands can be removed, and a suitable rolling/winding machine can be arranged at the required position. A bobbin, such as a metal bobbin, can be arranged in the rolling machine chuck by adjusting the machine and then locking the machine by a plunger and locking the bobbins using bolts. For example, a 2.5 m bobbin may be used for 200 cm width layers and a 2.1 m bobbin may be used for 160 cm width layers.

Then, the machine wheels are locked and the rolling machine is connected to the power supply. The pedal switch is placed in the required position. Once everything is positioned, the glass fibre layers are rolled onto the bobbin by successively feeding the layers to the rolling machine. Preferably, the rotational speed of the rolling machine is adjustable.

Advantageously, the machine is stopped when about 0.5 m of the layer end is still left on the table. The subsequent fibre layer is then arranged to overlap with the first layer, and both layers are firmly held at the opposing edges until one rotation of the bobbin is completed. Then, the layer is release during continued rotation. The area of overlap can be gradually increased depending on the roll diameter. All subsequent fibre layers/sheets are fed onto the bobbin in the same manner.

Once the rolling operation has been finalized for a given bobbin, the rolling machine is stopped and the bobbin can be covered using foil. The bobbin can be removed from the rolling/winding machine and can be placed in a suitable storage or transportation arrangement. When storing different bobbins for a given blade shell in this manner, it is preferred that the bobbins are arranged in the predefined order of layup, i.e. with the bobbin for the first layup sequence in a topmost position. The bobbins stored in this fashion can then be transported to the blade layup site.

At the mold for the blade shell, such as a shell half, root layer unwinding fixtures can be arranged in pre-defined position. The fixtures preferably face towards the same direction. A shaft with bearings can be placed inside the bobbin and its position is centered. The root plate lifting chain can be used to lift and place the bobbin on the fixtures. In some embodiment, more than one bobbin, e.g. two bobbins can be arranged on respective fixtures simultaneously, wherein a smaller width roll is arranged at a lower position, and a larger width roll is arranged at a higher position.

The bobbins should be placed such that the layer bottom surface is downwards and facing towards root. The shaft should be placed on the fixtures with enough extended end on either side. After placing the rolls, the locking pins of the fixtures can be inserted. The fibre layers/sheets can then be successively pulled from the bobbin, wherein the operator inside the mold can pull the root glass layers from the bobbin. An operator at the leading or trailing edge can also pull the layers/sheets when the size is reduced or whenever the weight of the layers allows for such operation. The brakes can be applied whenever the layer/sheet is not being pulled or the roll/bobbin is to be stopped.

In another aspect, the present invention relates to a stack of interconnected plies for manufacturing a wind turbine rotor blade part, the stack comprising a plurality of plies, a plurality of plastic fasteners inserted in the plurality of plies, each plastic fastener having an elongated, preferably flexible, filament with a first enlargement at a first end of the filament and a second enlargement at an opposing second end of the filament, wherein the plurality of plastic fasteners interconnect the plurality of plies, wherein the stack of interconnected plies has at least one stepwise tapering edge.

In another aspect, the present invention relates to a kit of parts for manufacturing a wind turbine rotor blade part, the kit of parts comprising a plurality of stacks of interconnected plies according to the present invention, each stack having at least one stepwise tapering edge, wherein the stepwise tapering edge of a first stack of interconnected plies is complementary to a stepwise tapering edge of a second stack of interconnected plies in the kit of parts, such that the first and second stacks of interconnected plies can be brought into mating engagement along said respective complementary tapering edges.

In a preferred embodiment, the stack of interconnected plies is a laminate, preferably a glass fibre laminate. Preferably, the stack comprises at least 10 layers. In some embodiments, the material of at least one of the plies is a uniaxial fibre material. In a preferred embodiment, the material of at least one of the plies is a biaxial fibre material. Typically, the stack of the present invention comprises both uniaxial and biaxial fibre layers.

In some embodiments, the stack of plies has a length-width ratio of at least 5:1. In other embodiments, the stack has a length-width ratio of at least 5:1, such as at least 10:1. All features and embodiments described above with respect to the method of manufacturing a wind turbine blade part likewise apply to the stack of interconnected plies and to the kit of part of the present invention and vice versa.

In another aspect, the present invention relates to a wind turbine blade or a wind turbine blade part obtainable by the method of the present invention, and to a wind turbine blade comprising a wind turbine blade part obtainable by the method of the present invention.

Such wind turbine blade has improved structural characteristics as the inventive method leads to less wrinkle formation and improved quality of the resulting part.

As used herein, the term "longitudinal" means an axis or direction running substantially parallel to the maximum linear dimension of the element in question.

As used herein, the term "elongated", refers to an element having two dimensions that are much less than a third dimension, such as at least three, five, ten or twenty times less than a third dimension. Typically, the third dimension will be the length (longitudinal extension), as opposed to the two lesser dimensions, width and thickness.

As used herein the term "fabric" means a material comprising a network of fibres including, but not limited to, woven or knitted materials, tufted or tufted-like materials, nonwoven webs.

DETAILED DESCRIPTION OF THE INVENTION

Figure 2:
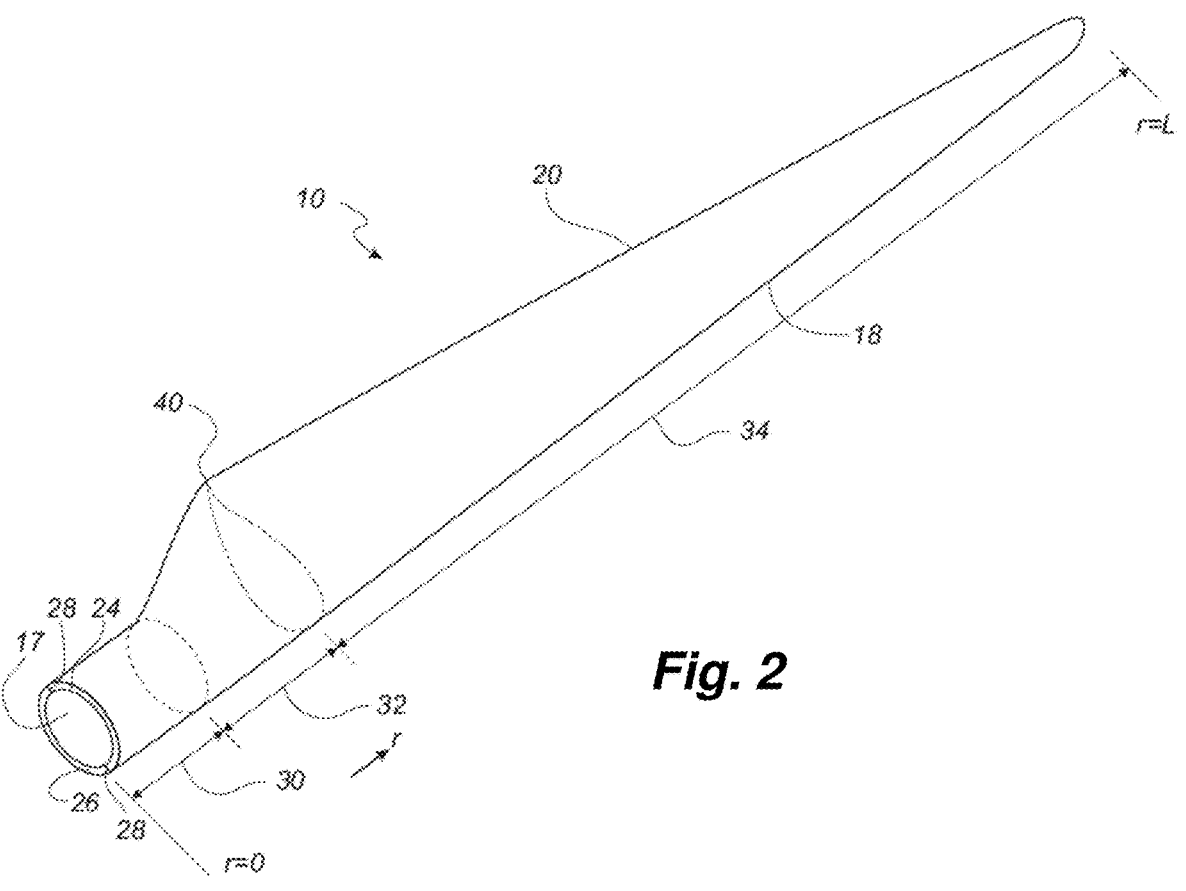
Figure 3:
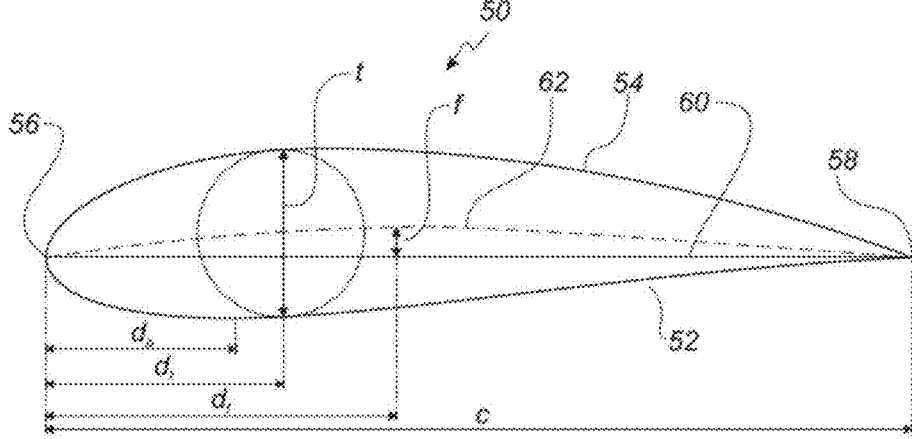
Figure 4:
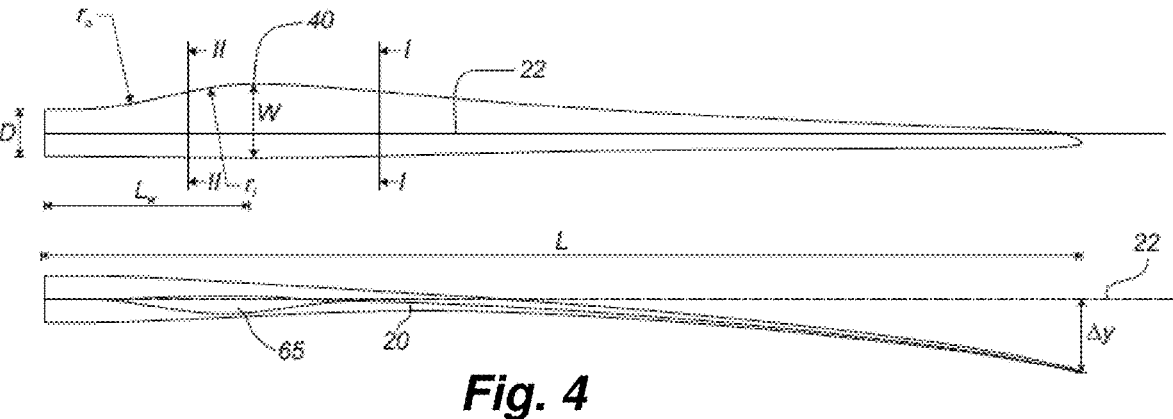
Figure 5:
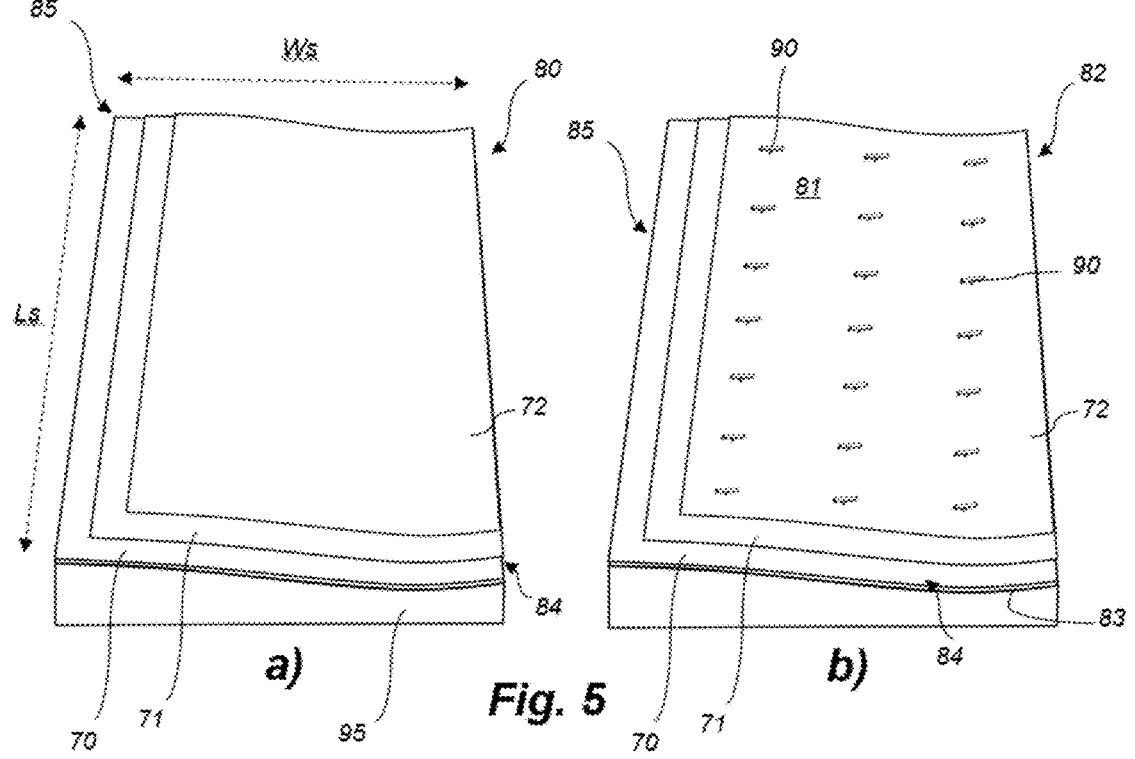
Figure 6:
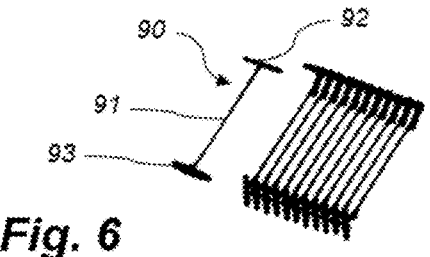
Figures 7A, 7B, 8:
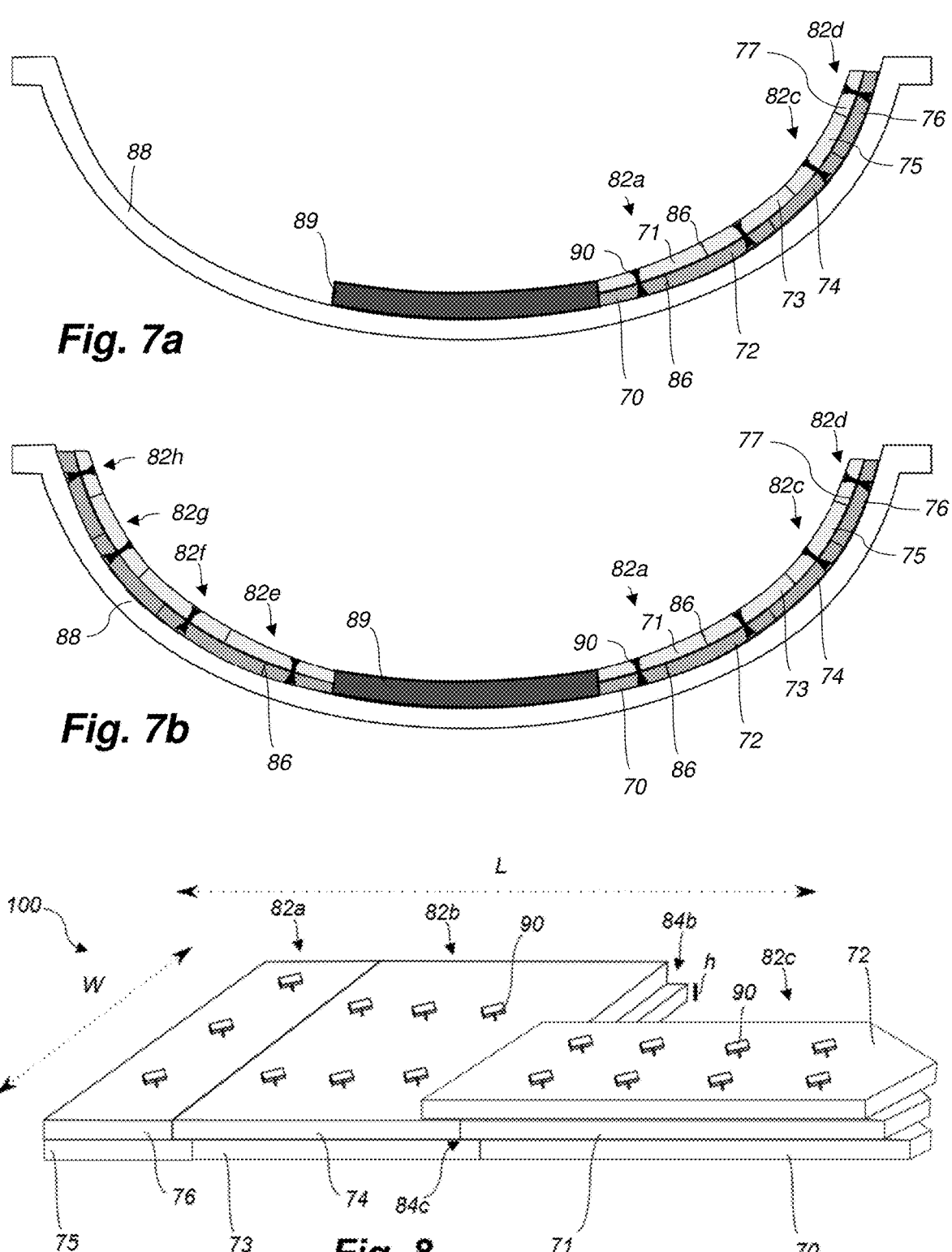
Figure 9:
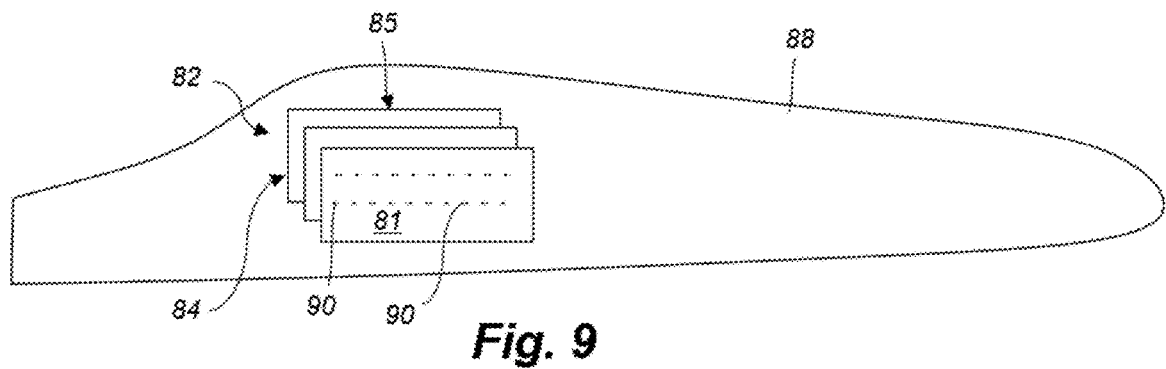
Figure 12:
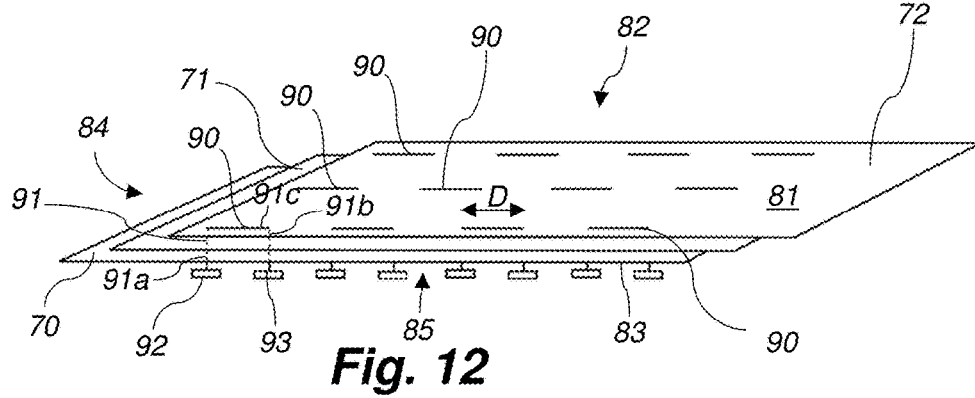
Figure 13:
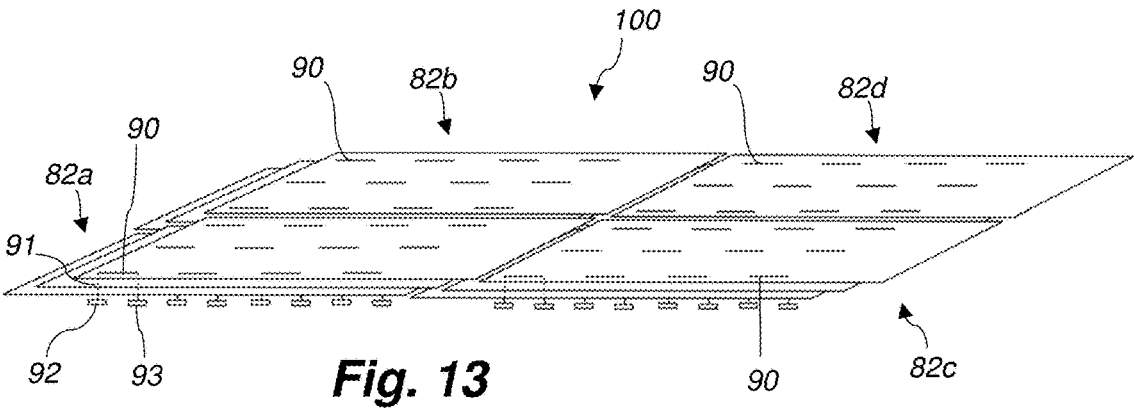
Figure 10:
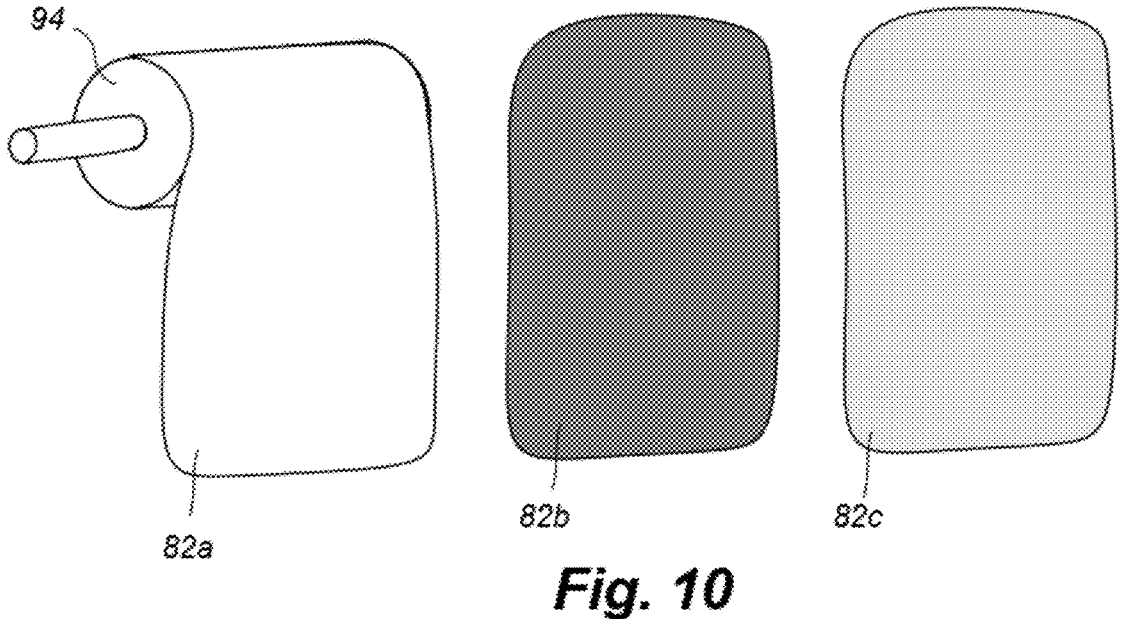
Figure 11:
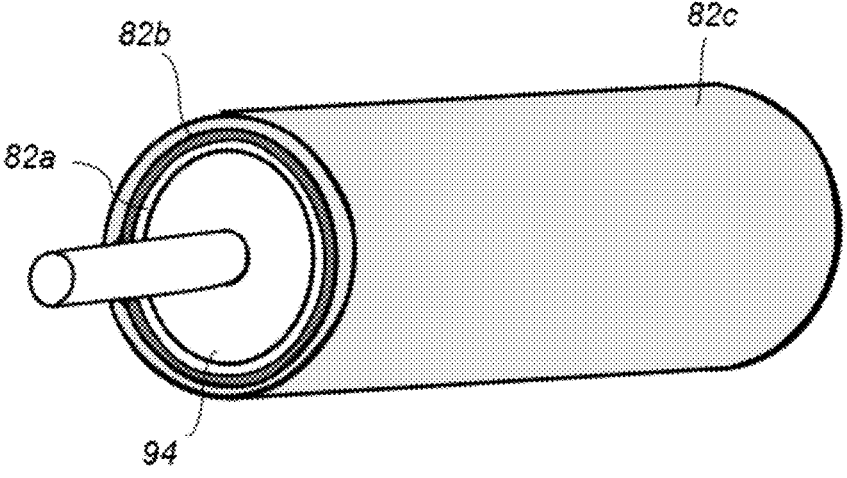

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a perspective view illustrating a method for forming a stack of interconnected plies according to the present invention, FIG. 6 is a perspective view of plastic fasteners for use in a method of manufacturing a wind turbine rotor blade part according to the present invention, FIG. 7*a* is a schematic sectional view of a blade mold for use in a method of manufacturing a wind turbine rotor blade part according to the present invention, FIG. 7*b* is a schematic sectional view of a blade mold, illustrating a second stage of a method of manufacturing a wind turbine rotor blade part according to the present invention, FIG. 8 is a perspective drawing of a kit of parts comprising a plurality of stacks of interconnected plies according to the present invention, FIG. 9 is a top view of a blade mold for use in a method of manufacturing a wind turbine rotor blade part according to the present invention, FIG. 10 is a schematic view of a method of rolling a plurality of stacks of interconnected plies onto a bobbin in a predefined order, FIG. 11 is a schematic view of the resulting bobbin with the plurality of stacks of interconnected plies in the predefined order, FIG. 12 is a perspective view illustrating another embodiment of forming a stack of interconnected plies according to the present invention, and FIG. 13 is a perspective drawing of a kit of parts comprising a plurality of stacks of interconnected plies according to another embodiment of the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention. FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. 5 is a perspective view illustrating a method for forming a stack of interconnected plies according to the present invention. A plurality of plies 70, 71, 72 is stacked, thus forming a stack of plies 80; see FIG. 5a. This can be done on a suitable molding surface on a preform mold 95. The stack 80 of plies 70, 71, 72 has two stepwise tapering edges 84, 85, the first edge 84 extending in the width direction Ws of the stack and the second stepwise tapering edge 85 extending in the longitudinal direction Ls of the stack 80.

A plurality of plastic fasteners 90 are used to interconnect the plies 70, 71, 72 by passing the plurality of plastic fasteners 90 through the stack of plies to form a stack of interconnected plies 82. As best seen in FIG. 6, each plastic fastener has an elongated filament 91 with a first enlargement 92 at a first end of the flexible filament and a second enlargement 93 at an opposing second end of the flexible filament. Each fastener extends between the top surface 81 and the bottom surface 83 of the stack 82. The first enlargements of the fasteners are seen above the top surface 81 in FIG. 5b.

These steps are preferably repeated several times for forming a plurality of stacks 82a, 82b, 82c, 82d of interconnected plies 82. As shown in FIG. 7a, a blade mold 88 is provided defining an outer shape of the rotor blade or a portion thereof, and the stacks 82a, 82b, 82c, 82d of interconnected plies are arranged within the blade mold, in the illustrated example next to a spar cap 89. As seen in FIG. 7a, the stepwise tapering edges of adjacent stacks 82a, 82b are complementary to each other, such that they can be arranged in mating engagement along their respective complementary tapering edges along interface 86. The same applies to adjacent stacks 82b, 82c, and 82c, 82d.

FIG. 7b shows a further stage of the manufacturing process, wherein stacks 82e, 82f, 82g, 82h of interconnected plies are arranged within the blade mold next to the other side of spar cap 89, as compared to FIG. 7a. Again, the stepwise tapering edges of adjacent stacks 82e, 82f are complementary to each other, such that they can be arranged in mating engagement along their respective complementary tapering edges along interface 86. The same applies to adjacent stacks 82f, 82g, and 82g, 82h.

Resin can then be infused into the one or more stacks of interconnected plies within the blade mold 88, followed by curing and/or hardening the resin in order to form the blade part.

FIG. 8 is a perspective drawing of a kit of parts comprising a plurality of stacks 82a, 82b, 82c of interconnected plies according to the present invention. The stacks 82a, 82b, 82c can be matingly arranged on a blade mold, such as shown for a single stack in the top view of FIG. 9. The longitudinal blade direction is indicated at L, whereas the width direction or the chordwise direction is indicated at W in FIG. 8. As also seen in FIG. 8, the height h of each step may correspond to the thickness of each ply. The stepwise tapering edge 84b of a first stack 82b of interconnected plies is complementary to a stepwise tapering edge 84c of a second stack 82c of interconnected plies in the kit of parts, such that the first and second stacks of interconnected plies can be brought into mating engagement along said respective complementary tapering edges. The same applies to the other stacks shown in the illustrated embodiment.

FIG. 12 is a perspective view illustrating another embodiment of a method for forming a stack of interconnected plies according to the present invention. A stack 82 of interconnected plies 70, 71, 72 is formed, for example on a suitable molding surface on a preform mold (not shown). The stack 82 of plies 70, 71, 72 has two stepwise tapering edges 84, 85.

In the illustrated embodiment, a plurality of plastic fasteners 90 are interconnecting the plies 70, 71, 72, wherein each fasteners 90 is passed through the stack of plies such that both the first enlargement 92 and the second enlargement 93 are located on the same side of the stack. Thus, the filament 91 extends from the first enlargement through the plies 70, 71, 72, as indicated by the hatched line in FIG. 12, to emerge on the top surface 81, where the filament extends along a distance D, to then again pass through the plies 70, 71, 72 towards the second enlargement 93. Thus, it is seen that a first portion 91a and a second portion 91b of the elongated filament is oriented substantially normal to the top surface 81 and/or to the bottom surface 83 of the stack, whereas a third portion 91c, which is located between the first portion 91a and the second portion 91b, is oriented substantially parallel or in-plane with the top surface 81.

FIG. 13 is a perspective drawing of a kit of parts comprising a plurality of stacks 82a, 82b, 82c, 82d of interconnected plies of the type illustrated in FIG. 12. The stacks 82a, 82b, 82c, 82d can be matingly arranged on a blade mold (not shown). A stepwise tapering edge of a first stack 82a of interconnected plies is complementary to a stepwise tapering edge of a second stack 82c of interconnected plies in the kit of parts, and so on. Hence, the stacks of interconnected plies can be brought into mating engagement along said respective complementary tapering edges.

FIG. 10 is a schematic view of a method of rolling a plurality of stacks 82a, 82b, 82c of interconnected plies onto a bobbin 94 in a predefined order. FIG. 11 illustrates the resulting arrangement of plies on bobbin 94. Thus, the stacks of interconnected plies can be successively unrolled from the bobbin 94 during layup in the blade mold. In the illustrated embodiment, stack 82c would be unrolled and laid first, followed by stack 82b and stack 82a, i.e. in the reverse order as compared to said predefined order. Thus, layup mistakes can be efficiently reduced by such arrangement.

The invention is not limited to the embodiments described herein, and may be modified or adapted without departing from the scope of the present invention.

LIST OF REFERENCE NUMERALS 2 wind turbine
4 tower
6 nacelle
8 hub 10 blade
14 blade tip
16 blade root
18 leading edge
20 trailing edge
22 pitch axis
24 first shell half
26 second shell half
30 root region
32 transition region
34 airfoil region
40 shoulder/position of maximum chord
50 airfoil profile
52 pressure side
54 suction side
56 leading edge
58 trailing edge
60 chord
62 camber line/median line
70 first ply
71 second ply
72 third ply
73 fourth ply
74 fifth ply
75 sixth ply
76 seventh ply
77 eighth ply
80 stack of plies
81 top surface of stack
82 stack of interconnected plies
83 bottom surface of stack
84 first stepwise tapering edge
85 second stepwise tapering edge
86 interface
88 blade mold
89 spar cap
90 fastener
91 filament
92 first enlargement
93 second enlargement
94 bobbin
95 preform mold
100 kit of parts
c chord length
$d_t$ position of maximum thickness
$d_f$ position of maximum camber
$d_p$ position of maximum pressure side camber
D distance of filament on top surface
h height of step
f camber
L blade length or longitudinal direction of blade
W width or chordwise direction of blade
Ls longitudinal direction of stack
Ws width direction of stack
r local radius, radial distance from blade root
t thickness
Δy prebend

The invention claimed is:

1. A method of manufacturing a wind turbine rotor blade part, the method comprising:
   stacking a plurality of plies to form a stack of plies such that the stack of plies has at least one stepwise tapering edge;
   providing a plurality of plastic fasteners, each plastic fastener of the plurality of plastic fasteners comprising an elongated filament with a first enlargement at a first end of the elongated filament and a second enlargement at an opposing second end of the elongated filament;

interconnecting the plurality of plies of the stack of plies by passing the plurality of plastic fasteners through the stack of plies to form a stack of interconnected plies, wherein each of the plurality of plastic fasteners is passed through the stack of plies twice such that the first enlargement and the second enlargement are located at the same surface of the stack of plies;

providing a blade mold defining an outer shape of at least a portion of the wind turbine rotor blade part;

arranging the stack of interconnected plies within the blade mold;

infusing resin into the stack of interconnected plies within the blade mold; and curing and/or hardening the resin to form the wind turbine rotor blade part.

2. The method according to claim 1, further comprising:

forming a plurality of stacks of interconnected plies, each of the plurality of stacks of interconnected plies having at least one stepwise tapering edge, wherein the stepwise tapering edges of the plurality of stacks of interconnected plies are complementary to each other; and arranging the plurality of stacks of interconnected plies within the blade mold in mating engagement along their respective complementary tapering edges.

3. The method according to claim 1, wherein the stack of plies has a longitudinal direction (Ls) and a width direction (Ws), and wherein the at least one tapering edge is provided in the width direction.

4. The method according to claim 3, wherein the stack of plies has a first tapering edge in the width direction and a second tapering edge longitudinal direction.

5. The method according to claim 1, wherein a height (h) of each ply in the stack of plies corresponds to a thickness of each ply.

6. The method according to claim 1, wherein the plurality of plastic fasteners are I-shaped.

7. The method according to claim 1, wherein at least five (5) plastic fasteners up to 20 plastic fasteners of the plurality of plastic fasteners are applied per m$^2$ of a top surface of the stack of plies.

8. The method according to claim 2, wherein the plurality of stacks of interconnected plies successively rolled up onto a bobbin in a predefined order, and wherein the plurality of stacks of interconnected plies are successively unrolled from the bobbin, and arranged within the blade mold in a reverse order as compared to the predefined order.

9. The method according to claim 1, wherein the plurality of plastic fasteners disintegrate after infusing the resin into the stack of interconnected plies.

10. The method according to claim 1, wherein the plurality of plastic fasteners comprise a thermoplastic polymer.

11. The method according to claim 1, wherein passing the plurality of plastic fasteners through the stack of plies is carried out using a tagging gun.

12. The method according to claim 1, wherein the stack of plies comprises from 5 plies to 20 plies, and wherein each of the plurality of plies in the stack of plies is constructed of a fibre material.

13. The method according to claim 1, wherein the plurality of plies of the stack of plies comprises at least one of different lengths and different widths.

14. The method according to claim 1, wherein one or more of the plurality of plastic fasteners are spaced from an edge of a topmost ply of the plurality of plies by a distance of not more than 20 millimeters.

15. The method according to claim 1, wherein the plurality of plastic fasteners are arranged along all edges of the stack of plies.

16. A method of manufacturing a wind turbine rotor blade part, the method comprising:

stacking a plurality of plies to form a stack of plies such that the stack of plies has at least one stepwise tapering edge;

providing a plurality of plastic fasteners, each plastic fastener of the plurality of plastic fasteners comprising an elongated filament with a first enlargement at a first end of the elongated filament and a second enlargement at an opposing second end of the elongated filament;

interconnecting the plurality of plies of the stack of plies by passing the plurality of plastic fasteners through the stack of plies to form a stack of interconnected plies;

providing a blade mold defining an outer shape of at least a portion of the wind turbine rotor blade part;

arranging the stack of interconnected plies within the blade mold;

infusing resin into the stack of interconnected plies within the blade mold, wherein the plurality of plastic fasteners dissolve upon resin infusion into the stack of interconnected plies, and wherein the plurality of plastic fasteners comprise a thermoplastic polymer; and curing and/or hardening the resin to form the wind turbine rotor blade part.

* * * * *